(12) United States Patent
Itoh (10) Patent No.: US 8,529,066 B2
(45) Date of Patent: Sep. 10, 2013

(54) PROJECTOR THAT SWITCHES BETWEEN POLARIZATION STATES

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 13/078,280

(22) Filed: Apr. 1, 2011

(65) Prior Publication Data

US 2011/0242490 A1 Oct. 6, 2011

(30) Foreign Application Priority Data

Apr. 2, 2010 (JP) ................. 2010-085850

(51) Int. Cl.
*G03B 21/14* (2006.01)
*G02F 1/1335* (2006.01)

(52) U.S. Cl.
USPC ............ 353/8; 353/20; 353/31; 349/5; 349/9

(58) Field of Classification Search
USPC ................. 353/8, 20, 31; 349/5, 9
See application file for complete search history.

(56) References Cited

U.S. PATENT DOCUMENTS

| 5,982,538 A * | 11/1999 | Shikama et al. ............. 359/465 |
| 2008/0225236 A1* | 9/2008 | Schuck et al. .................. 353/20 |
| 2010/0253920 A1 | 10/2010 | Miyazawa | |

FOREIGN PATENT DOCUMENTS

| JP | 63-018894 | 1/1988 |
| JP | 09-054375 | 2/1997 |
| JP | 2010-243543 | 10/2010 |

\* cited by examiner

*Primary Examiner* — Georgia Y Epps
*Assistant Examiner* — Magda Cruz
(74) *Attorney, Agent, or Firm* — Workman Nydegger (57) ABSTRACT

A projector includes a liquid crystal light valve to which first image data and second image data are alternately written and a polarization switching device that has a plurality of switching areas and switches a polarization state between a first polarization state and a second polarization state for each of the switching areas. A boundary position between a switching area that provides the first polarization state and a switching area that provides the second polarization state moves in synchronization with a boundary position between an area where the first image data is written and an area where the second image data is written.

15 Claims, 7 Drawing Sheets

PROJECTOR THAT SWITCHES BETWEEN POLARIZATION STATES

The entire disclosure of Japanese Patent Application No. 2010-85850, filed Apr. 2, 2010 is expressly incorporated by reference herein.

BACKGROUND

1. Technical Field

The present invention relates to a projector that projects and displays an optical image formed on a light modulator through a projection system on a screen, and more particularly to a projector that allows a viewer to observe a stereoscopic projected image through polarized eyeglasses.

2. Related Art

A technology for stereoscopically representing a displayed image by using a projector capable of large-screen display has been developed and brought into practical use. In stereoscopic image display using a projector, it is typical to use a parallax-based method in which images for the left and right eyes are projected on a screen and the left and right eyes view the respective images. In this process, the viewer needs to choose an image corresponding to each of the eyes. To this end, for example, a polarization-based projector using polarized eyeglasses has been known.

A polarization-based projector simultaneously displays images for the left and right eyes containing parallax information and having different polarization states on a screen. Alternatively, time-course frames are alternately and continuously displayed. When the viewer looks at the displayed images for the left and right eyes having different polarization states through polarized eyeglasses having polarization selectivity, each of the eyes selectively views only the corresponding one of the two types of image, whereby the displayed images can be visually recognized stereoscopically.

To simultaneously display images for the left and right eyes having polarization states different from each other on a screen, a method using two projectors has been proposed (see JP-A-9-54375). In the method, a first projector displays an image for the left eye and a second projector displays an image for the right eye. In the method using two projectors, it is difficult to match the brightness, color tone, and other characteristics of displayed images and adjust projection positions between the two projectors. Further, using two projectors is problematic in terms of size reduction and usability of the system.

On the other hand, the method in which images for the left and right eyes having polarization states different from each other are alternately and continuously displayed in a time division manner is advantageous in that only a single projector allows displayed images to be stereoscopically represented. A projector based on this method has also been proposed (see JP-A-63-18894).

In the stereoscopic image display apparatus described in JP-A-9-54375, inconvenience of having to prepare two projectors that project light fluxes having different polarization states is solved as follows: Two projectors that project light fluxes having the same polarization state are used, and a polarization switching device formed of a reflection mirror changes the polarization state of the light projected by one of the projectors. Images for the left and right eyes having different polarization states are thus produced. On the other hand, the projector described in JP-A-63-18894 alternately displays images for the left and right eyes in a time division manner by projecting light from a liquid crystal light valve via a polarization switching device formed of a liquid crystal panel that alternately switches the polarization state of the light. Both the apparatus need to have a device for switching the polarization state of projection light between a light modulator and a screen.

In addition to the apparatus described above, a DLP projector (DLP is a registered trademark of Texas Instruments Inc.) using a minute mirror-based light modulator having a large number of minute mirrors arranged in a matrix has been brought into practical use. The minute mirror-based light modulator, which rewrites image data by using a frame sequential method, keeps displaying an image corresponding to a frame for a fixed period, then instantaneously replaces the image with a new image corresponding to the next frame, and displays the new image for a fixed period. That is, the minute mirror-based light modulator cannot rewrite image data during each image display period. To allow the DLP projector to display a stereoscopic image, the polarization switching device described above is provided and used to switch the polarization states of projection light fluxes simultaneously across an image display area in synchronization with the timing at which the minute mirror-based light modulator instantaneously rewrites image data.

On the other hand, a liquid crystal projector including a light modulator using a liquid crystal material has been brought into practical use. A typical liquid crystal light modulator does not have an image memory that holds image data and covers the entire pixels but rewrites the image data by using a line sequential method, that is, a method for sequentially scanning one or more lines (sometimes referred to as a scan line) from one side to the other. In the liquid crystal projector, a one-frame image is taken as a set of line-shaped images, which are sequentially rewritten on a line basis in the period during which the one frame is displayed. A new image corresponding to the next frame is thus produced. That is, a one-frame image is a mixture of image data corresponding to the current frame and new image data corresponding to the next frame with a scan line interposed therebetween.

A polarization switching device used in a liquid crystal projector therefore needs to switch the polarization state of projection light by using a line sequential method in accordance with the liquid crystal light modulator that writes image data by using a line sequential method. That is, a light transmissive area of the polarization switching device is segmented into a plurality of line-shaped areas, and the polarization state of light passing through each of the areas is switched individually. The polarization switching device also needs to include a polarization state switching device in each of the areas or externally include a scan circuit for sequentially selecting each of the areas and switching the polarization state of light passing therethrough. A polarization switching device of this type is hereinafter referred to as a "segmented-area polarization switching device."

However, since projection light having exited from the liquid crystal light modulator is divergent light, a segmented-area polarization switching device simply disposed immediately downstream of the liquid crystal light modulator disadvantageously receives the projection light whose diameter has increased after it had exited from each pixel in the liquid crystal light modulator. To address the problem, it is conceivable to increase the number of segmented areas, each of which switches the polarization state of the projection light, in the segmented-area polarization switching device. In this case, however, the positions where image data are written in the liquid crystal light modulator still do not match the positions where the polarization states are switched in the segmented-area polarization switching device with precision of at least approximately one line (row) or several to several tens of lines in the pixel arrangement. As a result, for example, part of an image for the left eye has a polarization state that should not present in the image for the left eye (but should present in an image for the right eye) or suffers from other unwanted phenomena. The polarization state of a projected image is thus locally disturbed, and the local portion does not provide an appropriate stereoscopic viewing state, resulting in degradation in image quality.

The above description has been made with reference to the line sequential method, which is a typical scheme of writing image data in a liquid crystal light modulator. In some cases, a liquid crystal light modulator sequentially rewrites image data on a pixel basis, in other word, performs what is called point sequential writing. The problem described above also occurs in a projector based on the point sequential method.

SUMMARY

An advantage of some aspects of the invention is to provide a projector that displays a stereoscopic image by displaying images for left and right eyes having different polarization states alternately along the temporal axis, particularly, a projector that displays a stereoscopic image of high image quality even when the projector uses a light modulator that writes image data by using a line sequential or point sequential method.

A projector according to a first aspect of the invention includes a light source, a light modulator that modulates light from the light source based on first image data corresponding to an image for the left eye or second image data corresponding to an image for the right eye, the first image data and the second image data written in advance alternately in first and second periods temporally adjacent to each other to a plurality of pixels arranged in a matrix by using a line sequential method, a polarization switching device having a plurality of linear switching areas where the polarization state of light incident thereon is switched between a first polarization state and a second polarization state along a temporal axis, the polarization switching device switching the polarization state between the first polarization state and the second polarization state for each of the plurality of switching areas by using the line sequential method, a light transfer system that transfers light modulated by the light modulator to the polarization switching device and substantially focuses the modulated light on the polarization switching device to form an intermediate image, a projection system that projects the intermediate image formed on the polarization switching device, and a controller that controls the polarization switching device. The controller switches the polarization state between the first polarization state and the second polarization state by using the line sequential method in such a way that a boundary position on the polarization switching device between a switching area that provides the first polarization state and a switching area that provides the second polarization state is shifted substantially in synchronization with a shift of a boundary position that is on the intermediate image and corresponds to a boundary position on the light modulator between an area where the first image data is written and an area where the second image data is written.

Since the projector according to the first aspect includes the light transfer system that transfers light outputted from the light modulator to the polarization switching device and substantially focuses the modulated light on the polarization switching device to form an intermediate image thereon, projection light outputted from a predetermined pixel in the light modulator can be precisely directed to a predetermined location on the polarization switching device even when the light modulator and the polarization switching device are separated from each other and the light outputted from the light modulator is divergent light. Further, the polarization switching device, which is controlled by the controller, switches the polarization state between the first polarization state and the second polarization state by using the line sequential method in such a way that a boundary position on the polarization switching device between a switching area that provides the first polarization state and a switching area that provides the second polarization state is shifted substantially in synchronization with a shift of a boundary position that is on the intermediate image and corresponds to a boundary position on the light modulator between an area where the first image data is written and an area where the second image data is written. In this way, the image data writing in the light modulator can be spatially and temporally synchronized with the polarization state switching in the polarization switching device. As a result, a high-quality stereoscopic image can be displayed without any local disturbance of the polarization state of the projected image.

In the projector according to the first aspect of the invention, the number of switching areas in the polarization switching device may be equal to the number of rows formed of the pixels in the light modulator.

According to the configuration described above, groups of pixels which are arranged in the row direction and to which image data are written in the light modulator have a one-to-one relationship with the linear switching areas in the polarization switching device. In this case, the boundary position between portions where image data are written in the light modulator can be substantially completely synchronized with the boundary position between portions where different polarization states are provided in the polarization switching device in a spatial and temporal manner, whereby a higher-quality stereoscopic image can be displayed.

In the projector according to the first aspect of the invention, the number of switching areas in the polarization switching device may be smaller than the number of rows formed of the pixels in the light modulator.

In this configuration, since groups of pixels which are arranged in the row direction and to which image data are written in the light modulator do not have a one-to-one relationship with the linear switching areas in the polarization switching device, the boundary position between portions where image data are written in the light modulator cannot be completely synchronized with the boundary position between portions where different polarization states are provided in the polarization switching device, resulting in slight local disturbance of the polarization state of a projected image. The disturbance will, however, affect very little in practice when the size of the area where the disturbance of the polarization state occurs is much smaller than the entire image size. On the other hand, according to the configuration described above, a drive device and a drive circuit for driving the polarization switching device can be simplified and reduced in cost.

In the projector according to the first aspect of the invention, the number of switching areas in the polarization switching device may be greater than the number of rows formed of the pixels in the light modulator.

In this configuration, a plurality of switching areas in the polarization switching device corresponds to a group of pixels which are arranged in the row direction and to which image data are written in the light modulator. For example, when a liquid crystal device is used as the light modulator, depending on the structure of the liquid crystal device and the physical properties and other factors of the liquid crystal material in the liquid crystal device, it takes a long time to rewrite image data or what is called a response time is long in some cases. In this case, for example, performing fine switching by using a plurality of switching areas in the polarization switching device during the image data rewriting period allows local disturbance of the polarization state of projection light to be suppressed with precision.

A projector according to a second aspect of the invention includes a light source, a light modulator that modulates light from the light source based on first image data corresponding to an image for the left eye or second image data corresponding to an image for the right eye, the first image data and the second image data written in advance alternately in first and second periods temporally adjacent to each other to a plurality of pixels arranged in a matrix by using a point sequential method, a polarization switching device having a plurality of switching areas where the polarization state of light incident thereon is switched between a first polarization state and a second polarization state along a temporal axis, the polarization switching device switching the polarization state between the first polarization state and the second polarization state for each of the plurality of switching areas by using the point sequential method, a light transfer system that transfers light modulated by the light modulator to the polarization switching device and substantially focuses the modulated light on the polarization switching device to form an intermediate image, a projection system that projects the intermediate image formed on the polarization switching device, and a controller that controls the polarization switching device. The controller switches the polarization state between the first polarization state and the second polarization state by using the point sequential method in such a way that a boundary position on the polarization switching device between a switching area that provides the first polarization state and a switching area that provides the second polarization state is shifted substantially in synchronization with a shift of a boundary position that is on the intermediate image and corresponds to a boundary position on the light modulator between an area where the first image data is written and an area where the second image data is written.

The projector according to the first aspect writes image data by using a line sequential method, whereas the projector according to the second aspect writes image data by using a point sequential method. Also in the projector according to the second aspect, the image data writing in the light modulator can be spatially and temporally synchronized with the polarization state switching in the polarization switching device. As a result, a high-quality stereoscopic image can be displayed without any local disturbance of the polarization state of the projected image.

In the projector according to any of the first and second aspects of the invention, the light transfer system is desirably telecentric at least on the side where the light modulator is present. It is more desirable that the light transfer system is telecentric on both the side where the light modulator is present and the side where the polarization switching device is present.

In a telecentric optical system, a principal ray passes through the image-side focal point or the object-side focal point. Using a light transfer system formed of a telecentric optical system prevents the dimension and the shape of a transferred image from changing even when the light modulator or the polarization switching device is shifted in the optical axis direction, whereby the light modulator and the polarization switching device can be positioned without difficulty while an image can be precisely transferred.

In the projector according to any of the first and second aspects of the invention, the light transfer system may be a unity-magnification transfer system.

According to this configuration, precise image transfer is achieved by using a polarization switching device having polarization switching areas each of which has the same dimension and shape as those of each pixel area in the light modulator.

In the projector according to any of the first and second aspects of the invention, the light transfer system may be a reduction transfer system.

According to this configuration, the sizes of the polarization switching device and the projection system can be reduced, whereby the whole projector can be readily reduced in size and cost.

In the projector according to any of the first and second aspects of the invention, the light transfer system may be a magnifying transfer system.

According to this configuration, an intermediate image transferred to the polarization switching device is readily aligned therewith, whereby the polarization switching device is readily positioned with precision.

The projector according to any of the first and second aspects of the invention may further include a polarization compensation system that is disposed in the optical path between the light transfer system and the polarization switching device and compensates disturbance of the polarization state. Alternatively, the projector according to any of the first and second aspects of the invention may further include a light absorptive or light reflective polarization element disposed on the light incident side of the polarization switching device.

Since this configuration allows the degree of polarization of polarized light incident on the polarization switching device to increase, the polarization switching device can switch the polarization state of projection light completely, whereby a high-quality stereoscopic image can be displayed.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

A first embodiment of the invention will be described below with reference to FIGS. 1 to 7.

The present embodiment will be described with reference to what is called a three-panel liquid crystal projector in which three transmissive liquid crystal light valves are used as light modulators. The projector according to the present embodiment writes image data by using a line sequential method.

Figure 1:
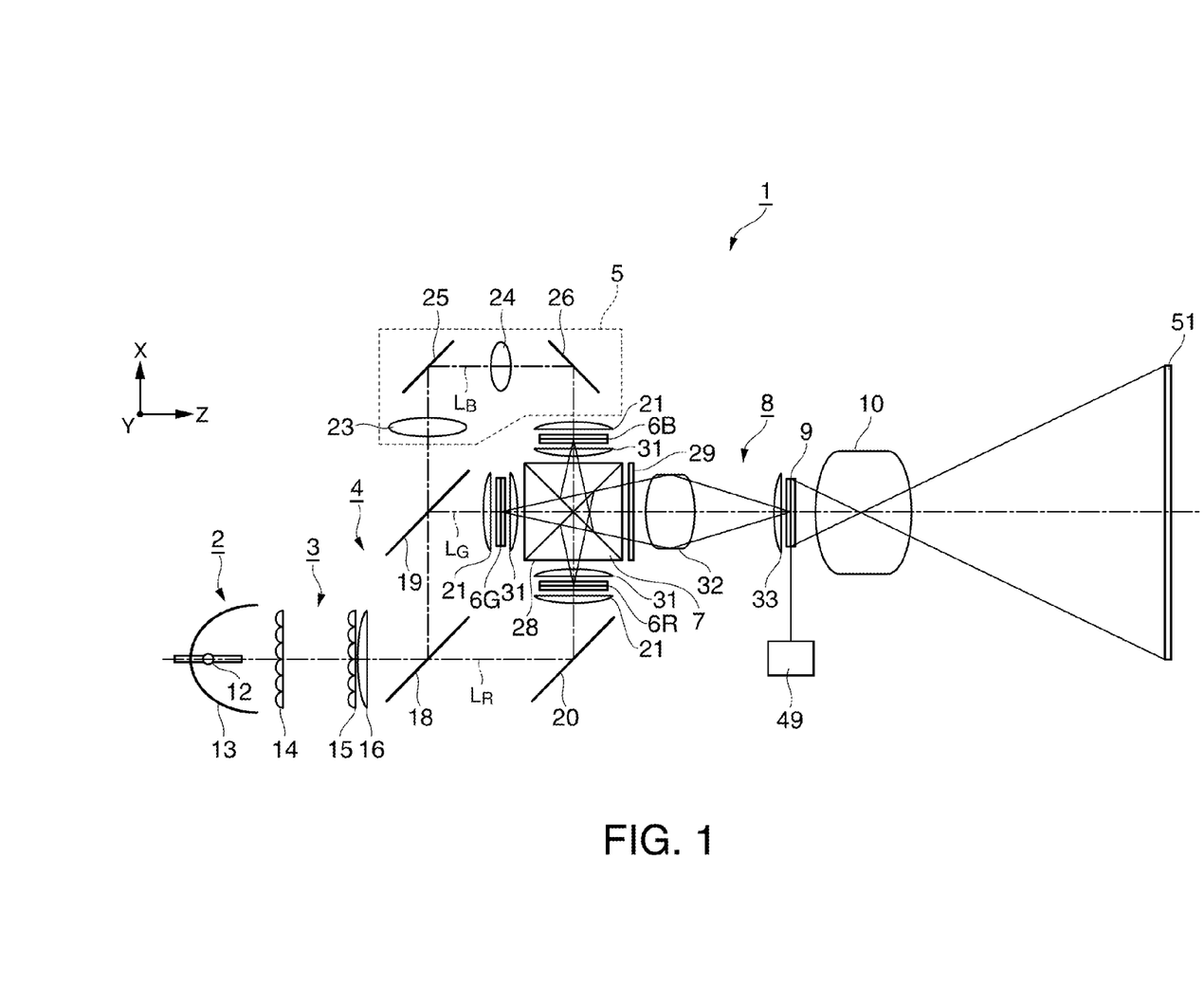
FIG. 1 shows a schematic configuration of a projector according to a first embodiment of the invention.
Figure 2A:
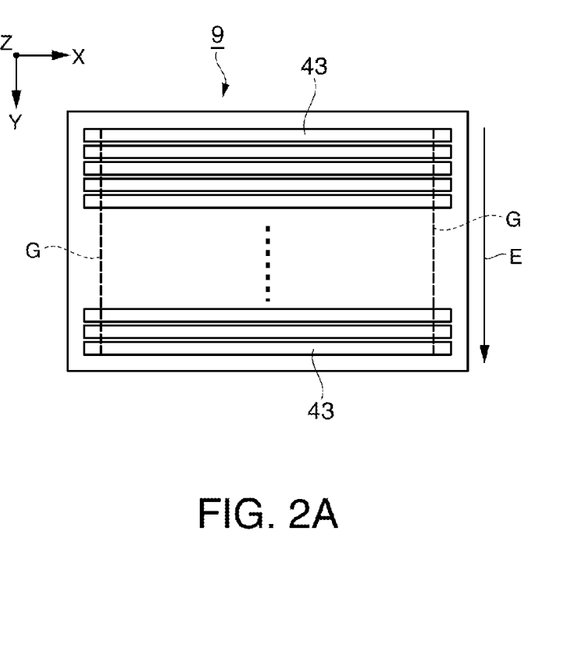
FIGS. 2A and 2B show a polarization switching device in the projector according to the first embodiment.
Figure 2B:
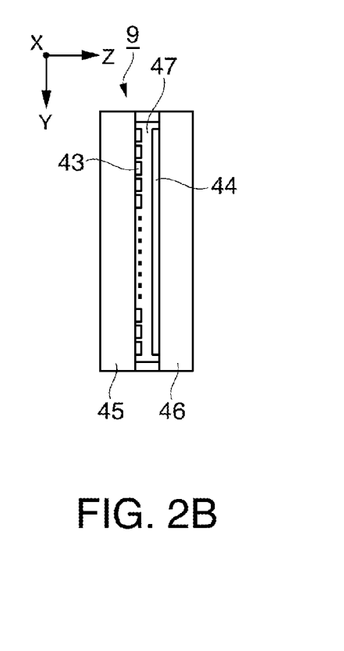
Figure 3A:
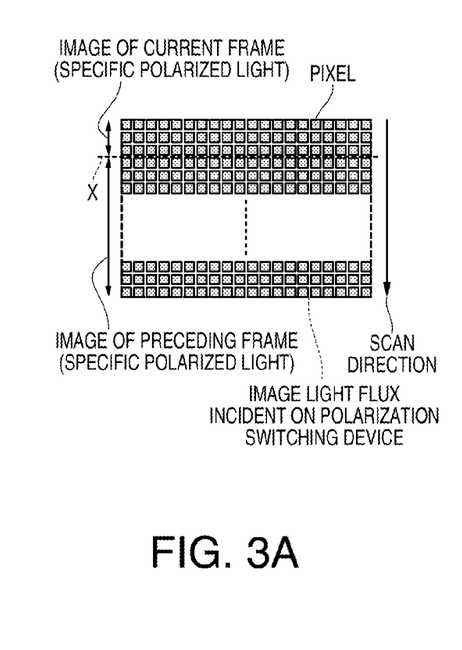
FIGS. 3A to 3C describe the relationship between the polarization switching device and image light.
Figure 3B:
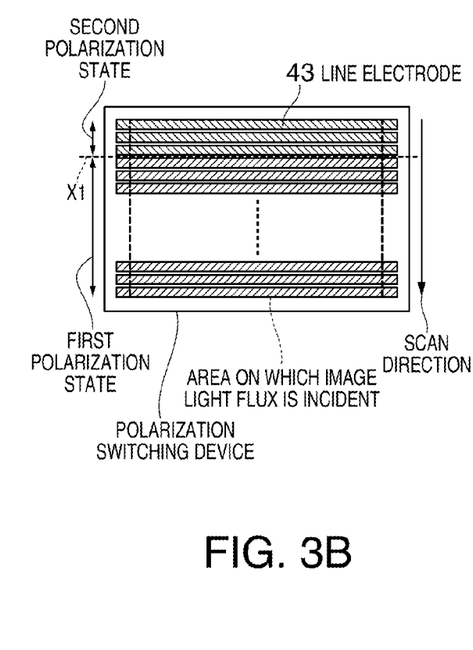
Figure 3C:
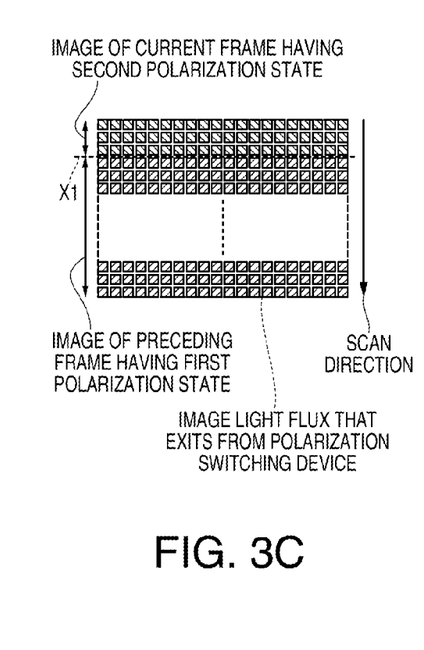
Figure 5:
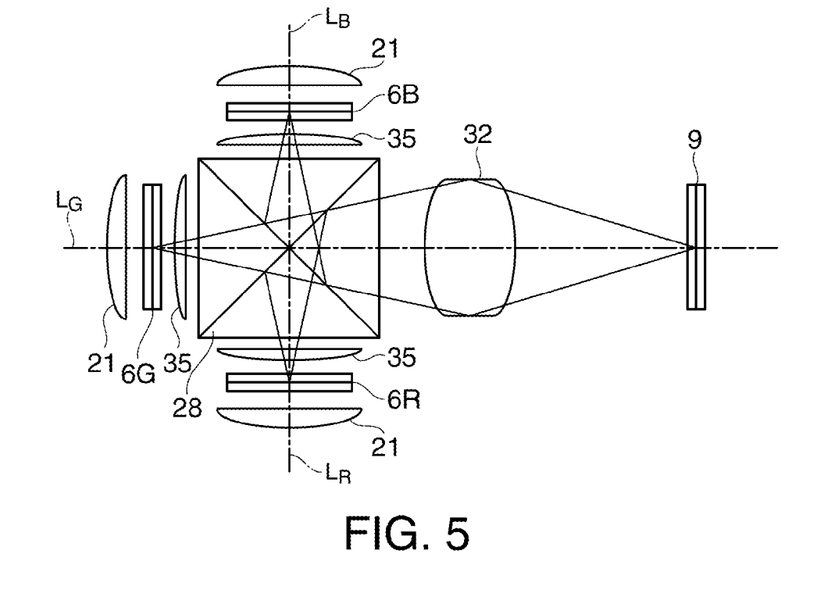
FIG. 5 shows an example of the configuration of the light transfer system to which an optical path length correction system is added.
Figure 6:
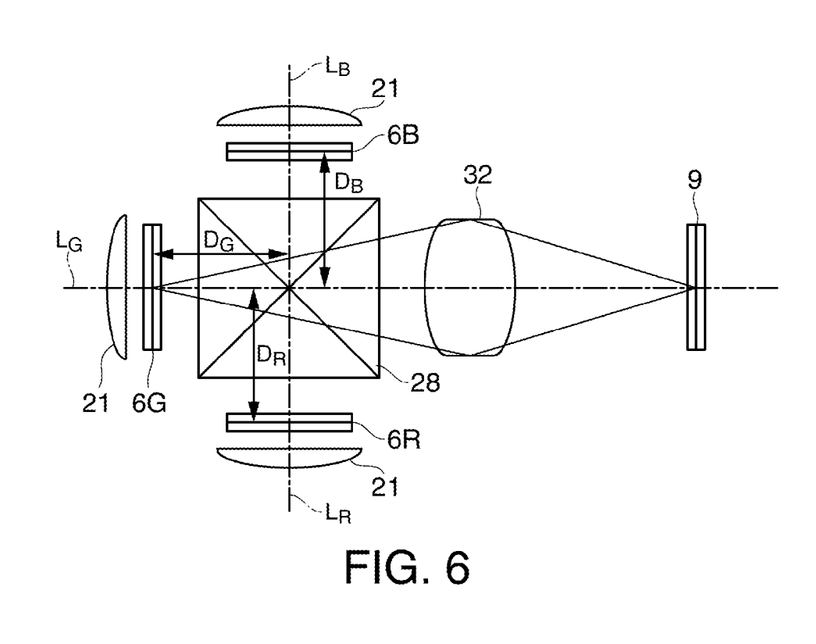
FIG. 6 shows another example of the configuration of the light transfer system that also corrects the optical path length.
Figure 7:
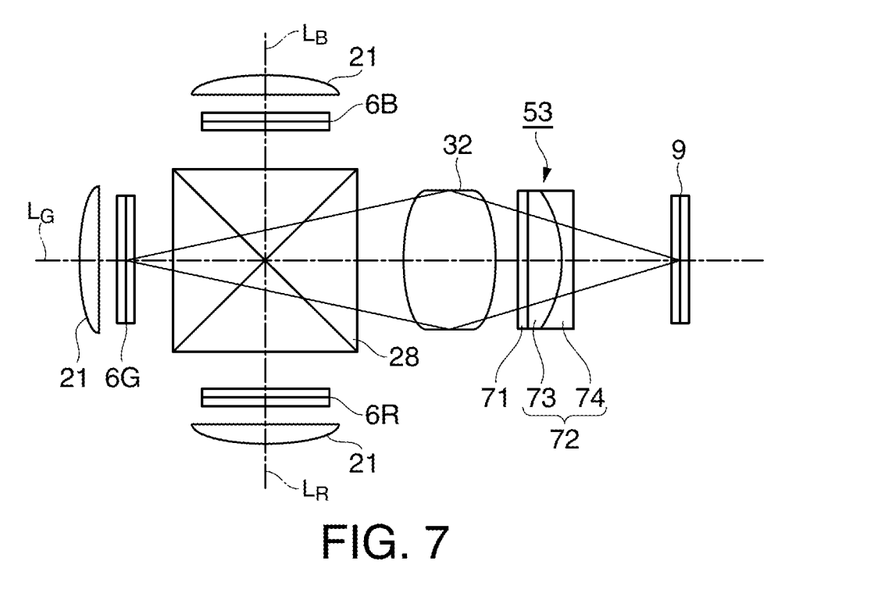
FIG. 7 shows an example of the configuration of the light transfer system to which a polarization compensation system is added.

FIG. 1 shows a schematic configuration of the projector according to the present embodiment. FIGS. 2A and 2B show a segmented-area polarization switching device in the projector according to the present embodiment. FIG. 2A is a plan view of the device in an xy plane and viewed in a z-axis direction, and FIG. 2B is a cross-sectional view of the device taken along a yz plan and viewed in an x-axis direction. FIGS. 3A to 3C describe the relationship between the segmented-area polarization switching device and image light. FIGS. 4A to 4E show several examples of the configuration of a light transfer system. FIG. 5 shows an example of the configuration of the light transfer system to which an optical path length correction system is added. FIG. 6 shows another example of the configuration of the light transfer system that also corrects the optical path length. FIG. 7 shows an example of the configuration of the light transfer system to which a polarization compensation system is added.

It is noted that some components are not to scale in some cases for ease of illustration throughout the following drawings. Further, in the following embodiments including the present embodiment, the segmented-area polarization switching device is sometimes simply described as a "polarization switching device."

A projector 1 according to the present embodiment primarily includes a light source 2, an optical integration system 3, a color separation system 4, an optical path length correction relay system 5, three liquid crystal light valves 6R, 6G, and 6B (light modulators) for modulating respective color light fluxes, a light combining system 7, a light transfer system 8, a polarization switching device 9, and a projection system 10, as shown in FIG. 1. Since the configuration of the present embodiment has two light transfer systems, they are distinguished from each other as follows: The one used to correct the optical path length of an illumination optical path is called the "optical path length correction relay system 5," and the other one used to transfer image light fluxes produced by the liquid crystal light valves to the polarization switching device is called the "light transfer system 8" (corresponding to the "light transfer system" in the claims).

Each of the components in the projector 1 will be described below.

The light source 2 includes a light source lamp 12 formed of an ultrahigh-pressure mercury lamp, a xenon lamp, or any other suitable lamp and emitting white light and a reflector 13 that reflects the light from the light source lamp and directs the reflected light toward the optical integration system 3. The optical integration system 3 includes a first lens array 14 and a second lens array 15, each of which is formed of a fly's eye lens or any other suitable optical component, and a superimposing lens 16. The optical integration system 3 has a function of substantially homogenizing the illuminance distribution of the light having exited from the light source 2 on each of the liquid crystal light valves 6R, 6G, and 6B.

The color separation system 4 includes dichroic mirrors 18 and 19 and a reflection mirror 20. Each of the dichroic mirrors 18 and 19, which is formed by laminating a dielectric multi-layer film on a glass surface, selectively reflects color light of a predetermined wavelength band contained in the incident white light and transmits color light of the other wavelength bands. The dichroic mirror 18 reflects green light LG and blue light LB and transmits red light LR. The dichroic mirror 19, on which the color light reflected off the dichroic mirror 18 is incident, reflects the green light LG and transmits the blue light LB. The reflection mirror 20 reflects the red light LR having passed through the dichroic mirror 18 toward a parallelizing lens 21 associated with the liquid crystal light valve 6R for modulating red light.

The optical path length correction relay system 5 includes a light incident-side lens 23, a relay lens 24, and reflection mirrors 25 and 26 and has a function of correcting optical loss due to the fact that the blue light LB travels a longer optical distance to the liquid crystal light valve 6B than the other color light LR and LG. The light incident-side lens 23 has a function of efficiently guiding light to the relay lens 24. The relay lens 24 has a function of transferring light within the light incident-side lens 23 and in the vicinity thereof to a parallelizing lens 21 and the vicinity thereof located upstream of the liquid crystal light valve 6B for modulating blue light. The optical path length correction relay system 5 transfers the blue light LB having been incident on the light incident-side lens 23 to the spatially separated liquid crystal light valve 6B with the optical intensity distribution of the blue light substantially preserved and with the amount of light substantially not lost.

Each of the liquid crystal light valves 6R, 6G, and 6B includes a pair of substrates and a liquid crystal material sandwiched therebetween and has a plurality of pixels whose transmittance is individually controllable arranged in a matrix. A plurality of scan lines and a plurality of data lines are so provided in a light transmissive area that the scan lines and the data lines intersect each other. Image data are supplied to the plurality of data lines and written to a plurality of pixels (a group of pixels) arranged in the row direction corresponding to each of the plurality of scan lines by scanning the scan lines from one side to the other by using a line sequential method. For example, the liquid crystal light valve 6R for modulating red light optically modulates the incident red light substantially parallelized by the corresponding parallelizing lens 21 based on the image data and outputs image light bearing an optical image. The liquid crystal light valve 6G for modulating green light and the liquid crystal light valve 6B for modulating blue light operate in the same manner as the liquid crystal light valve 6R for modulating red light.

In the present embodiment, the image data is formed of first image data corresponding to an image for the left eye and second image data corresponding to an image for the right eye. The first image data is written to a first sub-frame (first period) by using a line sequential method, and the second image data is written to a second sub-frame (second period) temporally adjacent to the first sub-frame by using the line sequential method. The writing operation is repeated, whereby the first and second image data are alternately written. The liquid crystal light valves 6R, 6G, and 6B perform optical modulation based on the thus written first or second image data. The frame rate at which a sub-frame is switched to the next one is set at 120 Hz.

The light combining system 7 includes a cross dichroic prism 28 and a wavelength selective phase plate 29. The cross dichroic prism 28 has a structure in which four triangular prisms are bonded to each other. The surfaces along which the triangular prisms are bonded to each other work as selective reflection surfaces of the cross dichroic prism 28. The cross dichroic prism 28 has inner surfaces that function as: a selective reflection surface off which the red light LR is reflected and through which the green light LG passes and a selective reflection surface off which the blue light LB is reflected and through which the green light LG passes, the two surfaces intersecting each other at right angles. The green light LG incident on the cross dichroic prism 28 passes through the selective reflection surfaces and goes straight out of the cross dichroic prism 28, and the red light LR and the blue light LB are selectively reflected off the respective selective reflection surfaces and exit in the same direction as the green light LG exits.

The wavelength selective phase plate 29, when receiving incident light, selectively converts the polarization state of color light of a specific wavelength band and can, for example, be Color Select (trade name of Color Link Inc.). That is, image light fluxes outputted from the liquid crystal light valves 6R, 6G, and 6B are linearly polarized because they pass through polarizers (not shown) disposed on the light exiting side of the light valves and incident on the cross dichroic prism 28 with the green light LG being P-polarized and the red light LR and the blue light LB being S-polarized in consideration of the efficiency in the cross dichroic prism 28, which is the light combining system 7. The image light fluxes incident on the cross dichroic prism 28 are combined into image light that forms a color image and outputted. The image light outputted from the cross dichroic prism 28 is incident on the wavelength selective phase plate 29, where only the green light LG undergoes polarization direction rotation by 90 degrees and becomes S-polarized light. The image light formed of the three color light fluxes having the same polarization state exits through the wavelength selective phase plate 29. It is, of course, also possible to employ a configuration in which the color light fluxes LR, LG, and LB outputted from the liquid crystal light valves 6R, 6G, and 6B and passing and exiting through the light exiting-side polarizers (not shown) have the same linearly polarized state (S-polarized state, for example). In this case, the wavelength selective phase plate 29 is not required.

The light transfer system 8 includes light incident-side lenses 31, a relay lens 32, and a light exiting-side lens 33. The light transfer system 8 has a function of transferring the image light fluxes outputted from the liquid crystal light valves 6R, 6G, and 6B to the polarization switching device 9 and focusing the image light fluxes on the polarization switching device 9 to form intermediate images. The light transfer system 8 in the present embodiment is a unity-magnification transfer system but may alternatively be a reduction transfer system or a magnifying transfer system. The imaging magnification of the light transfer system 8 will be described later.

The light incident-side lenses 31 are disposed between the liquid crystal light valves 6R, 6G, 6B and the cross-dichroic prism 28. The light incident-side lenses 31 have a function of efficiently guiding the image light fluxes from the liquid crystal light valves 6R, 6G, and 6B to the relay lens 32. The relay lens 32 has a function of transferring the image light fluxes within the light incident-side lenses 31 and in the vicinity thereof in such a way that the image light fluxes are combined in the cross dichroic prism 28 and focused into intermediate images on the polarization switching device 9. Since the light combining characteristic of the cross dichroic prism 28 depends on the angle of incidence, the light incident-side lenses 31 may not be disposed on the light exiting side of the liquid crystal light valves 6R, 6G, and 6B, but a single light incident-side lens may be disposed in the vicinity of to the light exiting end surface of the cross dichroic prism 28, in which case, the amount of color unevenness that tends to occur when the color light fluxes are combined in the cross dichroic prism 28 can be reduced. The light exiting-side lens 33 has a function of efficiently guiding the image light having exited through the relay lens 32 to the polarization switching device 9.

The light transfer system 8 desirably produces little distortion, lateral chromatic aberration, and other optical aberrations, and so does the relay lens 32. From this point of view, it is effective to form the relay lens 32 with a plurality of lenses, an aspheric lens, or a lens made of low-dispersion glass material. Further, the light transfer system 8 is not necessarily formed of a lens but may be formed of a reflection mirror or any other suitable reflective optical component or may be a combination of a lens and a reflection mirror. Moreover, the light incident-side lenses 31, which are effective in improving the transfer efficiency, are not essential optical elements and may be omitted depending on the characteristics of the image light fluxes outputted from the liquid crystal light valves 6R, 6G, and 6B and the configuration of the light transfer system.

It is desirable that the light transfer system 8 produces little optical aberrations, as described above. More specifically, the light transfer system 8 desirably has an image transfer characteristic that depends little on wavelength. The reason for this is that an image for red light, an image for green light, and an image for blue light are formed from light fluxes of different wavelength bands in the liquid crystal light valves 6R, 6G, and 6B but handled only by the single light transfer system 8. The light transfer system 8 is therefore desirably made of an optical material of zero or low dispersion.

Alternatively, the following and other measures are effective in reducing the amount of optical aberrations: An optical path length correction system 35 is disposed on the light exiting side of each of the liquid crystal light valves 6R, 6G, and 6B to correct the optical path length for the corresponding color as shown in FIG. 5, and the optical path lengths for the respective colors are corrected by changing the distances DR, DG, and DB between the liquid crystal light valves 6R, 6G, 6B and the polarization switching device 9 as shown in FIG. 6. It is noted in FIG. 6 that the arrows indicating the distances DR, DG, and DB are drawn from the liquid crystal light valves 6R, 6G, and 6B only to the optical axis along which the respective color light fluxes exit for ease of illustration.

Further, in the configuration including a plurality of liquid crystal light valves, to precisely superimpose and reliably transfer the image light fluxes from the liquid crystal light valves 6R, 6G, and 6B to the polarization switching device 9, it is necessary to set the optical distances between the liquid crystal light valves 6R, 6G, 6B and the polarization switching device 9 in accordance with a predetermined relationship in consideration of the optical characteristics of the light transfer system 8 described above. That is, it is necessary to precisely position the liquid crystal light valves 6R, 6G, and 6B in the axial direction of projection light, which is, however, a difficult task. It is therefore desirable to use a light transfer system that is telecentric at least on one side of the liquid crystal light valves 6R, 6G, and 6B, more desirably on both sides thereof. In a telecentric optical system, a principal ray passes through the image-side focal point or the object-side focal point. Using a telecentric optical system prevents the dimension and the shape of transferred images from changing even when the liquid crystal light valves 6R, 6G, and 6B or the polarization switching device 9 is shifted in the optical axis direction, whereby the liquid crystal light valves 6R, 6G, and 6B and the polarization switching device 9 can be positioned without difficulty while images can be precisely transferred.

Figure 4A:
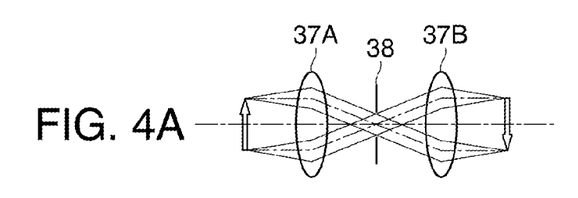
FIGS. 4A to 4E show several examples of the configuration of a light transfer system.
Figure 4B:
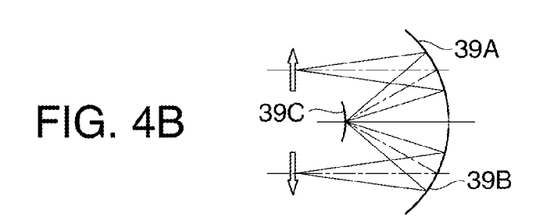
Figure 4C:
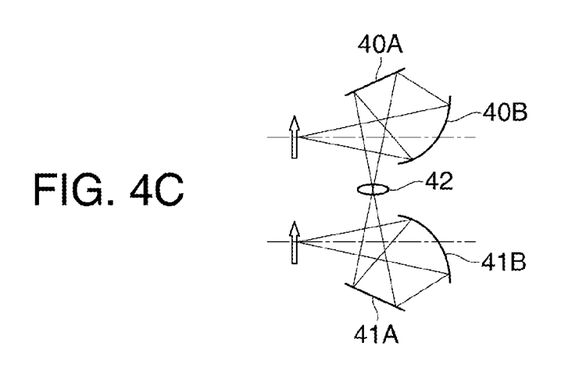
Figure 4D:
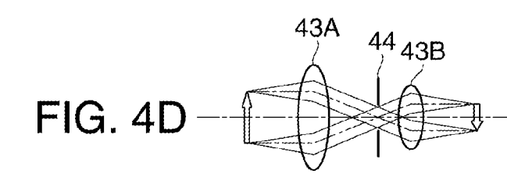
Figure 4E:
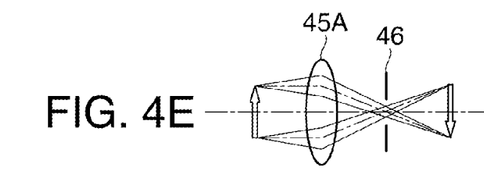

FIGS. 4A to 4E show several examples of the telecentric light transfer system described above. FIG. 4A shows an example of a lens-based light transfer system that is telecentric on both object and image sides and includes two lenses 37A and 37B and one light stop 38. FIG. 4B shows an example of a mirror-based light transfer system that is telecentric on both object and image sides and includes three reflection mirrors 39A, 39B, and 39C. FIG. 4C shows an example of a lens/mirror-based light transfer system that is telecentric on both object and image sides and includes two pairs of mirrors 40A/40B and 41A/41B and one lens 42. FIG. 4D shows an example of a reduction transfer system that is telecentric on both object and image sides and includes two lenses 43A and 43B and one light stop 44. FIG. 4E shows an example of a light transfer system that is telecentric on the object side and includes one lens 45 and one light stop 46.

It is also desirable that the cross-dichroic prism 28, which is the light combining system 7, produces little optical aberrations and is hence made of an optical material of zero or low dispersion, as in the case of the light transfer system 8.

The polarization switching device 9 has a plurality of linear switching areas where the polarization states of the light fluxes incident from the liquid crystal light valves 6R, 6G, and 6B are switched between a first polarization state and a second polarization state along the temporal axis, and the first polarization state is switched to the second polarization state and vice versa for each of the plurality of switching areas by using a line sequential method. The polarization switching device 9 is formed of a liquid crystal device formed by encapsulating a liquid crystal material 47 having a predetermined orientation state between a pair of transparent substrates 45 and 46 on which transparent electrodes 43 and 44 are respectively formed, as shown in FIGS. 2A and 2B. Several types of liquid crystal device can be used as the polarization switching device 9, such as a ferroelectric liquid crystal device, a pi-cell liquid crystal device, a TN liquid crystal device, and other known liquid crystal devices. The polarization switching device 9 is desirably a liquid crystal device that operates as fast as possible.

One of the transparent substrates, the transparent substrate 45, has a plurality of line electrodes 43 formed thereon, and each of the line electrodes 43 is formed of an elongated transparent conductive film. The area where each of the line electrodes 43 is formed corresponds to the individual switching area where the polarization state of the incident light is temporally switched between the first polarization state and the second polarization state. The longitudinal dimension and shape of each of the line electrodes 43 (switching areas) correspond to the entire pixels arranged in the row direction (the direction in which the scan lines extend) in the liquid crystal light valves 6R, 6G, and 6B. The number of line electrodes 43 (switching areas) is equal to the number of pixels (the number of rows) arranged in the column direction (the direction in which the data lines extend) in the liquid crystal light valves 6R, 6G, and 6B. The other one of the transparent substrates, the transparent substrate 46, has a counter electrode 44 formed thereover, which is formed of a transparent conductive film.

The dimension of each of the line electrodes 43 in the row direction is set to be slightly greater than the dimension of the entire pixels arranged in the row direction in the liquid crystal light valves 6R, 6G, and 6B, that is, the length from the pixel at one end to the pixel at the other end. An area G to which the image light fluxes from the liquid crystal light valves 6R, 6G, and 6B are transferred is therefore positioned inside both ends of the line electrodes 43 in the longitudinal direction. The polarization switching device 9 is desirably held by a holder (holding member) whose position can be adjusted in all directions, the x-axis, y-axis, and z-axis directions. The light transfer system 8 needs to transfer the images provided from the liquid crystal light valves 6R, 6G, and 6B precisely to a predetermined position on the polarization switching device 9 so that groups of pixels contained in the images from the liquid crystal light valves 6R, 6G, and 6B and arranged in the row direction have a one-to-one relationship with the line electrodes 43 in the polarization switching device 9. To this end, the position adjustment mechanism (holding member) described above is provided to readily adjust (position) the polarization switching device 9 relative to the light transfer system 8.

The polarization switching device 9 is provided with a controller 49, as shown in FIG. 1, which includes a drive device and a drive circuit (both are not shown). The controller 49 sequentially applies voltages between the line electrodes 43 and the counter electrode 44 in the polarization switching device 9 in synchronization with the vertical line-sequential scan in the liquid crystal light valves 6R, 6G, and 6B to control the orientation of the liquid crystal material in the individual switching areas sandwiched between the line electrodes 43 and the counter electrode 44. In this way, the polarization state of the polarized light incident on the switching area corresponding to a specific line electrode can be changed from the first polarization state to the second polarization state or from the second polarization state to the first polarization state by using a line sequential method, and the resultant polarized light can be outputted while the line-sequential scan is performed, for example, in the direction indicated by the arrow E shown in FIG. 2A.

Specifically, for example, when S-polarized light, which is linearly polarized light, is incident on the polarization switching device 9, the polarization switching device 9 can rotate the polarization direction of the incident polarized light by 90 degrees and output P-polarized light, or output the original S-polarized light without any rotation of the polarization direction. When linearly polarized light fluxes having polarization directions perpendicular to each other are used as described above, optical shutter eyeglasses having a simple configuration can be used and hence the cost of the system can be reduced. Alternatively, the polarization switching device 9 can be combined with a quarter wave plate to output left-handed circularly polarized light or right-handed circularly polarized light. When light fluxes circularly polarized in opposite directions are used, a double-image effect unlikely occurs even when the viewer who does not face a projected image observes the image in an oblique direction, whereby a satisfactory stereoscopic viewing state can be achieved.

Many types of liquid crystal light valve write image data by using a line sequential method. That is, image data are simultaneously written to an entire group of pixels arranged in the row direction, and the group of pixels to which image data is written is sequentially shifted in the column direction, whereby image data are written to all the pixels. Eventually, a sub-frame image for the left or right eye is completed. The polarization switching device 9 is therefore so configured in correspondence with the line-sequential writing method employed by the liquid crystal light valves 6R, 6G, and 6B that one line electrode 43 corresponds to an entire group of pixels arranged in the row direction.

A description will next be made of how the image light flux outputted from each of the liquid crystal light valves 6R, 6G, and 6B and incident on the polarization switching device 9 is converted by the polarization switching device 9 into an image light flux having a predetermined polarization state with reference to FIGS. 3A to 3C. FIG. 3A shows the state of the image light flux incident on the polarization switching device 9. FIG. 3B shows the state of the polarization switching device 9. FIG. 3C shows the state of the image light flux that exits from the polarization switching device 9.

Look at now the image light flux incident on the polarization switching device 9 in detail. When each of the liquid crystal light valves 6R, 6G, and 6B writes image data in the vertical direction by using a line sequential method, the image formed on the polarization switching device 9 is continuously rewritten on a line basis. That is, an intermediate image formed by the image light flux incident on the polarization switching device 9 at a certain point of time is a mixture of an image of a preceding sub-frame and a newly rewritten image of the current sub-frame with a predetermined scan line (predetermined boundary position X) interposed therebetween, as shown in FIG. 3A.

The controller 49 applies predetermined voltages to the plurality of line electrodes 43 in the polarization switching device 9 by using a line sequential method in synchronization with the vertical shift of the scan line (boundary position X) to sequentially switch the orientation of the liquid crystal material to a predetermined state so that a boundary position X1 between the switching area where the liquid crystal material provides the first polarization state and the switching area where the liquid crystal material provides the second polarization state is shifted, as shown in FIG. 3B. In this way, the image light flux having passed through the polarization switching device 9 can have different polarization states in the portions above and below the boundary position X1, as shown in FIG. 3C, whereby the polarization states in the areas on opposite sides of the scan line will not be the same. For example, assume that the image of the preceding sub-frame having the first polarization state is an image for the left eye and the image of the current sub-frame having the second polarization state is an image for the right eye. The images for the left and right eyes having different polarization states, which are hence completely distinguished from each other, can be alternately and continuously displayed along the temporal axis.

As a result, images whose polarization state completely changes whenever the sub-frame changes are projected and displayed on a screen 51. For example, assume that an odd-numbered sub-frame image is an image for the left eye having the first polarization state and an even-numbered sub-frame image is an image for the right eye having the second polarization state. When the viewer observes projected images having the polarization states described above through polarized eyeglasses equipped with a left-eye polarization element that transmits only the light of the first polarization state and a right-eye polarization element that transmits only the light of the second polarization state, the polarized eyeglasses can guide the odd-numbered sub-frame image only to the left eye and the even-numbered sub-frame image only to the right eye separately from each other for a satisfactory stereoscopic viewing state.

As described above, since the projector 1 according to the present embodiment includes the light transfer system 8, which focuses image light fluxes from the liquid crystal light valves 6R, 6G, and 6B on the polarization switching device 9 to form intermediate images thereon, an image light flux outputted from a predetermined pixel in each of the liquid crystal light valves 6R, 6G, and 6B can be precisely directed to a predetermined switching area in the polarization switching device 9 even when the liquid crystal light valves 6R, 6G, and 6B and the polarization switching device 9 are separated from each other and the image light fluxes from the liquid crystal light valves 6R, 6G, and 6B are divergent light fluxes. Further, in the polarization switching device 9, since the boundary position between a switching area where the liquid crystal material provides the first polarization state and a switching area where the liquid crystal material provides the second polarization state is shifted in synchronization with the vertical shift of the boundary position between images on each of the liquid crystal light valves 6R, 6G, and 6B, the image data writing in each of the liquid crystal light valves 6R, 6G, and 6B can be spatially and temporally synchronized with the polarization state switching in the polarization switching device 9. As a result, a high-quality stereoscopic image can be displayed without any local disturbance of the polarization state of the projected image.

Since the projector 1 according to the present embodiment provides a stereoscopic viewing state by allowing the viewer to observe image light fluxes of two types of polarization state only with the corresponding respective eyes, the viewer may sense flickering, which leads to degradation in image quality, in some cases when image frames (sub-frames) are displayed at low speeds. To eliminate the problem, the speed at which image frames (sub-frames) are displayed is desirably at least approximately 120 Hz.

In the present embodiment, in which a unity-magnification transfer system is used as the light transfer system 8, precise image transfer is achieved by using the polarization switching device 9 having polarization switching areas whose dimension and shape are equal to those of pixel areas in the liquid crystal light valves 6R, 6G, and 6B. The light transfer system is not necessarily a unity-magnification transfer system but may be a reduction transfer system or a magnifying transfer system. When a reduction transfer system is used, that is, when images formed by the liquid crystal light valves 6R, 6G, and 6B, are reduced in size and transferred to the polarization switching device, the sizes of the polarization switching device and the projection system can be reduced, whereby the whole projector can be readily reduced in size and cost. In contrast, when a magnifying transfer system is used, that is, when images formed by the liquid crystal light valves 6R, 6G, and 6B are magnified and transferred to the polarization switching device, intermediate images transferred to the polarization switching device are readily aligned therewith, whereby the polarization switching device is readily positioned with precision.

In the present embodiment, since the polarization switching device 9 is disposed in a focal position of the projection system 10, and no intermediate object but air is present between the polarization switching device 9 and the projection system 10, the projection system can have a significantly short back focal distance. Although a shorter back focal distance results in a smaller F number and a larger lens diameter, a high-performance projection system can be readily provided. When the image transfer magnification of the light transfer system is set at a value different from unity, a projection system according to the magnification can still be relatively readily provided.

The number of line electrodes 43 (switching areas) in the polarization switching device 9 is desirably, but not necessarily, equal to the number of pixels arranged in the column direction in each of the liquid crystal light valves 6R, 6G, and 6B, as described in the present embodiment. When the number of line electrodes 43 (switching areas) in the polarization switching device 9 is not equal to the number of pixels arranged in the column direction in each of the liquid crystal light valves 6R, 6G, and 6B, a group of pixels in the row direction in each of the liquid crystal light valves 6R, 6G, and 6B does not have a one-to-one relationship with a switching area in the polarization switching device 9. In this case, the boundary position between images on each of the liquid crystal light valves 6R, 6G, and 6B is not completely synchronized with the boundary position between different polarization states in the polarization switching device 9. As a result, for example, a light flux that should have the first polarization state is outputted as a light flux having the second polarization state in the boundary position and the vicinity thereof, resulting in slight local disturbance of the polarization state of a projected image. The disturbance will, however, affect very little in practice when the size of the area where the disturbance of the polarization state occurs is much smaller than the entire image size.

In view of the fact described above, the number of line electrodes 43 (switching areas) in the polarization switching device 9 may be fewer than the number of pixels arranged in the column direction in each of the liquid crystal light valves 6R, 6G, and 6B. When the number of line electrodes 43 is at least approximately one-third the number of pixels arranged in the column direction in each of the liquid crystal light valves 6R, 6G, and 6B, the polarization switching device 9 will provide substantially intended performance. When the number of line electrodes 43 (switching areas) in the polarization switching device 9 is smaller than the number of pixels arranged in the column direction in each of the liquid crystal light valves 6R, 6G, and 6B, the drive device and the drive circuit for driving the polarization switching device 9 can be simplified and reduced in cost.

Conversely, the number of line electrodes 43 (switching areas) in the polarization switching device 9 may be greater than the number of pixels arranged in the column direction in each of the liquid crystal light valves 6R, 6G, and 6B. In this configuration, a plurality of line electrodes 43 (switching areas) in the polarization switching device 9 corresponds to the group of pixels in a single row in the row direction in each of the liquid crystal light valves 6R, 6G, and 6B. For example, depending on the structure of the liquid crystal device that forms each of the light modulators and the physical properties and other factors of the liquid crystal material in the liquid crystal device, it takes a long time to rewrite image data or what is called a response time is long in some cases. In this case, for example, performing fine switching by using a plurality of switching areas in the polarization switching device 9 during the image data rewriting period allows local disturbance of the polarization state of projection light to be suppressed with precision.

Further, to switch the polarization state of image light completely by the polarization switching device 9, the image light incident on the polarization switching device 9 desirably has a high degree of linear polarization. The image light fluxes outputted from the liquid crystal light valves 6R, 6G, and 6B, which are light modulators, inherently have a high degree of linear polarization, but the light combining system 7 (such as a cross dichroic prism having dichroic films formed of dielectric multilayer films) and the light transfer system 8 (including a lens and other similar optical components having certain curvature) present in the optical path to the polarization switching device 9 disturb the polarized light fluxes and their degrees of polarization decrease accordingly.

To address the problem, a polarization compensation system 53 that compensates any disturbance of polarized light due to the light combining system 7 and the light transfer system 8 is desirably disposed somewhere along the optical path between the relay lens 32 in the light transfer system 8 and the polarization switching device 9, as shown in FIG. 7. Since this configuration allows the degree of polarization of polarized light incident on the polarization switching device 9 to increase, the polarization switching device 9 can switch the polarization state of projection light completely, whereby a high-quality stereoscopic image can be displayed.

The polarization compensation system 53 can be a known rectifier. A rectifier is formed of a half-wave plate 71 and a lens 72 having no refracting power. The lens 72 having no refracting power is formed by combining a pair of lenses, a convex lens 73 and a concave lens 74, each of which has a steeply curved refracting surface of. The lens 72 having no refracting power can produce a difference in transmittance between P-polarized and S-polarized components of the transmitted light and hence rotate the polarization plane thereof. Adjusting the curvature radii of the curved surfaces and the refractive indices of the glass materials allows wide-range adjustment of the degree of rotation of the polarization. Further, forming a dielectric multilayer film that produces a desired amount of retardation on each surface of the half wave plate 71 and the lens 72 having no refracting power allows the transmitted light to have the desired amount of retardation.

On the other hand, when polarized color light fluxes outputted from the liquid crystal light valves 6R, 6G, and 6B pass through the cross dichroic prism 28 and the relay lens 32, the resultant changes in polarization are not completely the same. In the cross dichroic prism 28, the green light (G light) passes through the R-light reflecting surface and the B-light reflecting surface. The red light (R light) is reflected off the R-light reflecting surface and passes through the B-light reflecting surface. The blue light (B light) passes through the R-light reflecting surface and is reflected off the B-light reflecting surface. As a result, different amounts of retardation are given to the color light fluxes at the dielectric multilayer films on the R-light reflecting surface and the B-light reflecting surface (R-light reflecting dichroic film and B-light reflecting dichroic film). Further, in the relay lens 32, the degrees of rotation of the polarization planes of the color light fluxes differ from one another due to color dispersion associated with the refractive index of the glass material of the relay lens 32.

From the reasons described above, it is difficult for a rectifier to restore the original polarization states completely across the entire wavelength range. To restore the original polarization state completely, the size, the degree of complication, and the cost of the polarization compensation system could greatly increase. In this case, for example, it is conceivable to form the rectifier in such a way that change in the polarization state of the G light, to which human eyes are most sensitive, is minimized. Specifically, the dielectric multilayer films in the rectifier, the curvature radii of the lens 72 having no refracting power, and the glass materials of the rectifier are so adjusted that the amount of retardation given to the G light and the amount of rotation of the polarization plane of the G light are minimized. In this way, the polarization states of the image light fluxes can be compensated most effectively, while the size, the degree of complication, and the cost of the polarization compensation system 53 (rectifier) do not increase, whereby a high-quality stereoscopic image can be displayed. When an ultrahigh-pressure mercury lamp or any other mercury lamp is used in the light source 2, it is desirable to minimize the amount of retardation and the amount of rotation of the polarization plane at the e line (546.1 nm) and in the vicinity thereof, where the intensity is highest in the G light wavelength region.

The location where the polarization compensation system 53 can be disposed is limited due to room in the projector and other factors thereof to portions downstream of the cross dichroic prism 28, where the color light fluxes from the liquid crystal light valves 6R, 6G, and 6B are combined, (on the side where the polarization switching device 9 is present) and in the vicinity of the polarization switching device 9. Further, how much the degree of polarization decreases is not the same among the optical paths of the red light, the green light, and the blue light because dichroic elements and other optical elements disposed in the optical paths have different optical characteristics and the optical materials of these elements have different wavelength dispersion properties. The degrees of polarization of the image light fluxes incident on the polarization switching device 9 therefore cannot be compensated across the entire wavelength range. To address the problem, it is desirable in the present configuration that the amount of polarization compensation is set in accordance with the color light that suffers the largest decrease in the degree of polarization. It is alternatively desirable that the amount of polarization compensation is set to the average of the amounts of decrease in the degree of polarization of the three color light fluxes.

In the present example, a dielectric multilayer film for compensating the retardation produced in the cross dichroic prism 28 and the relay lens 32 is formed on at least one surface of the optical elements that form the rectifier, but the dielectric multilayer film is not necessarily formed in the rectifier but may be formed on a surface of any other optical element as long as the thus formed dielectric multilayer film provides the same function. Specifically, the dielectric multilayer film may be formed on the light exiting surface of the cross dichroic prism 28 or each surface of the relay lens 32. Further, among anti-reflection films typically formed on the surfaces described above, at least one of the anti-reflection films can be intentionally omitted so that retardation for compensation is effectively produced.

Moreover, the rectifier is not necessarily disposed downstream of the relay lens 32 (on the light exiting side thereof) but may be disposed upstream of the relay lens 32 (on the light incident side thereof). In this case, for example, the components of the rectifier shown in FIG. 7 may alternatively so configured that the lens 72 having no refracting power is disposed on the upstream side and the half-wave plate 71 is disposed on the downstream side.

As described above, using the polarization compensation system 53 allows disturbance of polarization to be compensated with very little optical loss. Alternatively, the polarization compensation system 53 may not be used, but a light absorptive or light reflective polarization element may be disposed on the light incident side of the polarization switching device. The polarization element can be any of a light absorptive polarization element using a stretchable film made of a polymer material, a light absorptive polarization element having light absorptive fine particles oriented in a certain direction, a light reflective or light absorptive polarization element using structural birefringence, or any other suitable polarization element. In this configuration, disturbance of polarization can be compensated at low cost.

Any of the polarization elements is desirably disposed immediately upstream of the polarization switching device (on the side where the liquid crystal light valves are present). Since any of the polarization elements absorbs or reflects unwanted polarization components to remove them, the degree of polarization of linearly polarized light incident on the polarization switching device increases, and the polarization switching device can completely switch the polarization states of image light fluxes, whereby a stereoscopic viewing state that allows high image quality is achieved.

Any of the polarization elements may alternatively be disposed in intimate contact with the light incident end surface of the polarization switching device. Further, a light absorptive polarization element is effectively used when the space where the polarization element is disposed is limited. Alternatively, a reflective polarization element may be used to remove unwanted polarization components that pass therethrough, and image light, which is reflected light, may be incident on the polarization switching device.

Second Embodiment

A second embodiment of the invention will be described below with reference to FIG. 8.

The basic configuration of a projector according to the present embodiment is the same as that in the first embodiment and only differs therefrom in terms of the way the liquid crystal light valves write image data. A description about this point will be only made.

Figure 8:
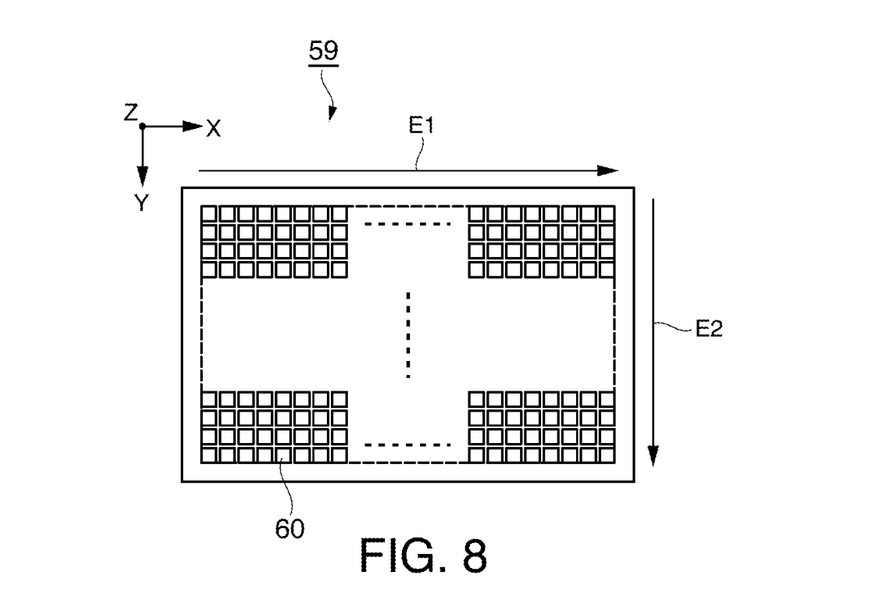
FIG. 8 shows a polarization switching device in a projector according to a second embodiment of the invention.

FIG. 8 shows a polarization switching device in the projector according to the present embodiment. FIG. 8 is a plan view of the polarization switching device in the projector according to the present embodiment in an xy plane and viewed in the z-axis direction in FIG. 1.

The first embodiment has been described with reference to the case where the liquid crystal light valves 6R, 6G, and 6B write image data by using a line sequential method. Some liquid crystal light valves, however, write image data by using a point sequential method. The projector according to the present embodiment uses liquid crystal light valves that write image data by using a point sequential method. In a liquid crystal light valve that employs a point sequential method, each of the pixels arranged in a matrix is sequentially selected, and image data is written to the pixel. An image corresponding to one frame is eventually completed.

When liquid crystal light valves that employs the writing method described above are used, it is necessary to use a polarization switching device 59 having a plurality of pixel-shaped electrodes 60 so arranged in a matrix that they substantially correspond to the pixels arranged in each of the liquid crystal light valves, as shown in FIG. 8, unlike the line electrodes 43 in the first embodiment. Also in the present embodiment, an intermediate image formed on the polarization switching device 59 at a certain point of time is a mixture of an image of a preceding sub-frame and a newly rewritten image of the current sub-frame with a predetermined boundary position interposed therebetween.

In the present embodiment, however, the boundary position is shifted not only in the vertical direction but also in the horizontal direction. Specifically, the boundary position is shifted in the horizontal direction indicated by the arrow E1 along a group of pixels in a predetermined row, then in the vertical direction indicated by the arrow E2, and in the horizontal direction again along a group of pixels in the next row. In accordance with the shift of the boundary position, the controller applies a predetermined voltage to each of the plurality of pixel-shaped electrodes 60 in the polarization switching device 59 by using a point sequential method to sequentially switch the orientation of the liquid crystal material to a predetermined state so that the boundary position between a switching area where the liquid crystal material provides a first polarization state and a switching area where the liquid crystal material provides a second polarization state is shifted in synchronization with the shift of the boundary position in the data writing operation.

Also in the present embodiment, since the image data writing in each of the liquid crystal light valves can be spatially and temporally synchronized with the polarization state switching in the polarization switching device. As a result, a high-quality stereoscopic image can be advantageously displayed without any local disturbance of the polarization state of the projected image, as in the first embodiment.

Third Embodiment

A third embodiment of the invention will be described below with reference to FIG. 9.

The first embodiment has been described with reference to the configuration in which transmissive liquid crystal light valves are used as the light modulators, whereas a projector according to the present embodiment will be described with reference to a configuration in which reflective liquid crystal light valves are used as the light modulators.

Figure 9:
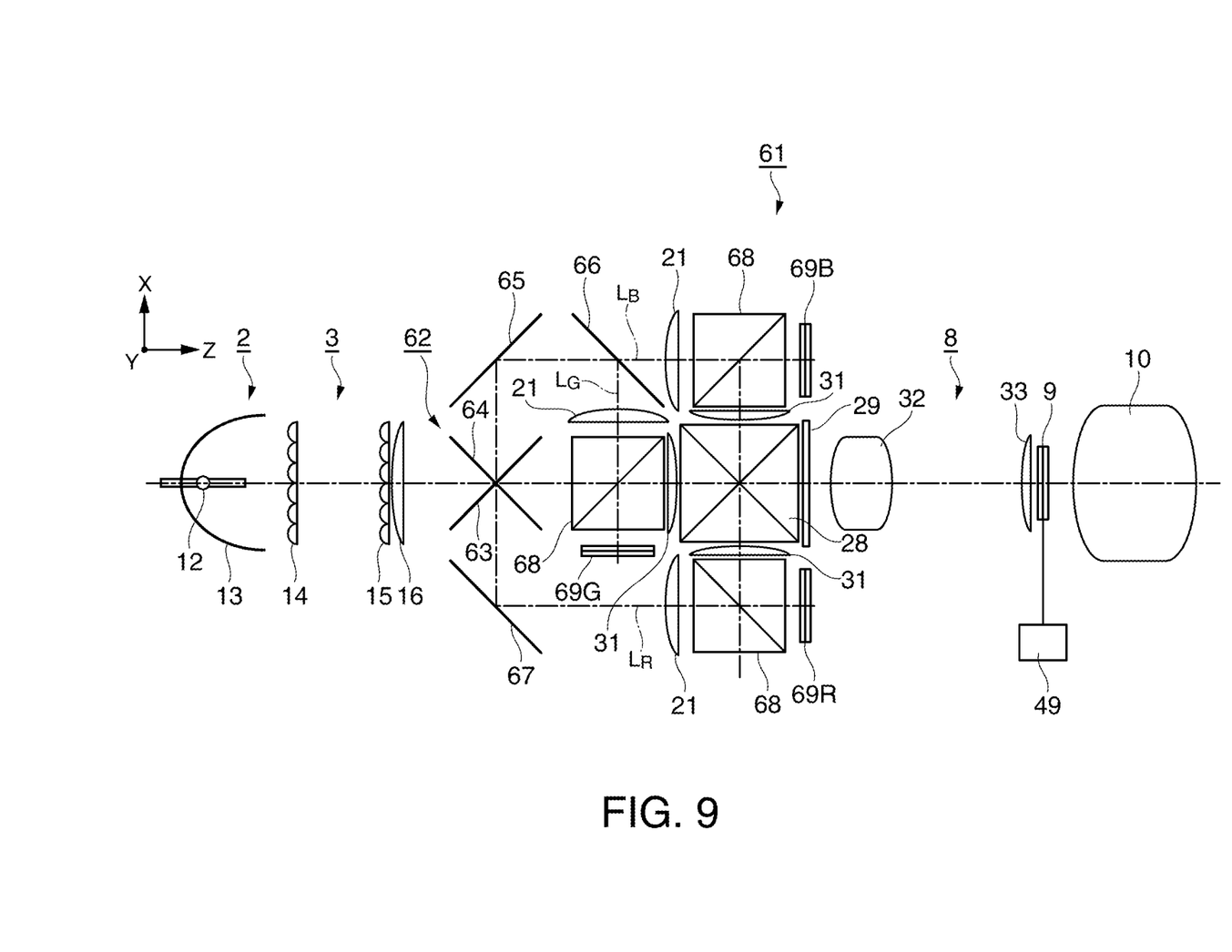
FIG. 9 shows a schematic configuration of a projector according to a third embodiment of the invention.

FIG. 9 shows a schematic configuration of the projector according to the present embodiment. In FIG. 9, the components common to those in the first embodiment shown in FIG. 1 have the same reference characters and no description of these components will be made.

In a projector 61 according to the present embodiment, dichroic mirrors 63 and 64, which form a color separation system 62, are provided on the light exiting side of the superimposing lens 16, which forms the optical integration system 3, as shown in FIG. 9. The dichroic mirror 63 reflects green light LG and blue light LB and transmits red light LR. The dichroic mirror 64 transmits green light LG and blue light LB and reflects red light LR. Further, a reflection mirror 65 and a dichroic mirror 66 are provided along the optical path of the green light LG and the blue light LB reflected off the dichroic mirror 63. The dichroic mirror 66, on which the green light LG and the blue light LB reflected off the dichroic mirror 63 are incident, reflects the green light LG and transmits the blue light LB.

The red light LR reflected off the dichroic mirror 64 is reflected off a reflection mirror 67, passes through the parallelizing lens 21, and enters a polarization separation prism 68. The polarization separation prism 68 has a polarization separation surface that, for example, transmits P-polarized light and reflects S-polarized light. The red light LR passes through the polarization separation surface, where the red light LR becomes polarized light having a specific polarization state, for example, P-polarized light, which enters a reflective liquid crystal light valve 69R. The liquid crystal light valve 69R modulates the light into light having a different polarization state, for example, S-polarized light, which is reflected off the polarization separation surface of the polarization separation prism 68 and incident on the cross dichroic prism 28, which is the light combining system. The green light LG having been reflected off the dichroic mirror 66 and the blue light LB having passed through the dichroic mirror 66 behave in the same manner as the red light LR, and no description thereof will therefore be made. Other configurations and effects are the same as those in the first embodiment.

In the example of the present configuration, each of the light incident-side lenses 31 in the light transfer system 8 is disposed between the corresponding polarization separation prism 68 and the cross dichroic prism 28. Alternatively, each of the light incident-side lenses 31 may be disposed between the corresponding polarization separation prism 68 and the corresponding one of the liquid crystal light valves 69R, 69G, and 69B. Still alternatively, the three light incident-side lenses 31 may be replaced with a single lens disposed on the light exiting side of the cross dichroic prism 28.

Also in the present embodiment, since the image data writing in each of the liquid crystal light valves 69R, 69G, and 69B can be spatially and temporally synchronized with the polarization state switching in the polarization switching device 9. As a result, a high-quality stereoscopic image can be advantageously displayed without any local disturbance of the polarization state of the projected image, as in the first embodiment.

The embodiments described above are not intended to limit the technical scope of the invention, but a variety of changes can be made to the embodiments to the extent that the changes do not depart from the substance of the invention. For example, a liquid crystal device is used as the polarization switching device in the embodiments described above, but a liquid crystal device is not necessarily used and any device that can locally and temporally switch the polarization state at high speed can be used. Further, each of the light modulators is not limited to a transmissive or reflective liquid crystal light valve but may be any other light modulator that writes image data by using a line sequential or point sequential method. In addition, the specific configuration of each of the components in the projector according to any of the embodiments described above is not necessarily used as it is but can be changed as appropriate.

What is claimed is:

1. A projector comprising:
a light source;
a light modulator that modulates light from the light source based on first image data corresponding to an image for the left eye or second image data corresponding to an image for the right eye, the first image data and the second image data written in advance alternately in first and second periods temporally adjacent to each other to a plurality of pixels arranged in a matrix by using a line sequential method;
a polarization switching device having a plurality of linear switching areas where the polarization state of light incident thereon is switched between a first polarization state and a second polarization state along a temporal axis, the polarization switching device switching the polarization state between the first polarization state and the second polarization state for each of the plurality of switching areas by using the line sequential method;
a light transfer system that transfers light modulated by the light modulator to the polarization switching device and substantially focuses the modulated light on the polarization switching device to form an intermediate image;
a projection system that projects the intermediate image formed on the polarization switching device; and
a controller that controls the polarization switching device, wherein the controller switches the polarization state between the first polarization state and the second polarization state by using the line sequential method in such a way that a boundary position on the polarization switching device between a switching area that provides the first polarization state and a switching area that provides the second polarization state is shifted substantially in synchronization with a shift of a boundary position that is on the intermediate image and corresponds to a boundary position on the light modulator between an area where the first image data is written and an area where the second image data is written.

2. The projector according to claim 1,
wherein the number of switching areas in the polarization switching device is equal to the number of rows formed of the pixels in the light modulator.

3. The projector according to claim 1,
wherein the number of switching areas in the polarization switching device is smaller than the number of rows formed of the pixels in the light modulator.

4. The projector according to claim 1,
wherein the number of switching areas in the polarization switching device is greater than the number of rows formed of the pixels in the light modulator.

5. The projector according to claim 1,
wherein the light transfer system is telecentric at least on the side where the light modulator is present.

6. The projector according to claim 1,
wherein the light transfer system is a unity-magnification transfer system.

7. The projector according to claim 1,
wherein the light transfer system is a reduction transfer system.

8. The projector according to claim 1,
wherein the light transfer system is a magnifying transfer system.

9. The projector according to claim 1,
further comprising a polarization compensation system that is disposed in the optical path between the light transfer system and the polarization switching device and compensates disturbance of the polarization state.

10. A projector comprising:
a light source;
a light modulator that modulates light from the light source based on first image data corresponding to an image for the left eye or second image data corresponding to an image for the right eye, the first image data and the second image data written in advance alternately in first and second periods temporally adjacent to each other to a plurality of pixels arranged in a matrix by using a point sequential method;
a polarization switching device having a plurality of switching areas where the polarization state of light incident thereon is switched between a first polarization state and a second polarization state along a temporal axis, the polarization switching device switching the polarization state between the first polarization state and the second polarization state for each of the plurality of switching areas by using the point sequential method;
a light transfer system that transfers light modulated by the light modulator to the polarization switching device and substantially focuses the modulated light on the polarization switching device to form an intermediate image;
a projection system that projects the intermediate image formed on the polarization switching device; and
a controller that controls the polarization switching device,
wherein the controller switches the polarization state between the first polarization state and the second polarization state by using the point sequential method in such a way that a boundary position on the polarization switching device between a switching area that provides the first polarization state and a switching area that provides the second polarization state is shifted substantially in synchronization with a shift of a boundary position that is on the intermediate image and corresponds to a boundary position on the light modulator between an area where the first image data is written and an area where the second image data is written.

11. The projector according to claim 10,
wherein the light transfer system is telecentric at least on the side where the light modulator is present.

12. The projector according to claim 10,
wherein the light transfer system is a unity-magnification transfer system.

13. The projector according to claim 10,
wherein the light transfer system is a reduction transfer system.

14. The projector according to claim 10,
wherein the light transfer system is a magnifying transfer system.

15. The projector according to claim 10,
further comprising a polarization compensation system that is disposed in the optical path between the light transfer system and the polarization switching device and compensates disturbance of the polarization state.

* * * * *